US009276682B2

(12) United States Patent
Bharadia et al.

(10) Patent No.: US 9,276,682 B2
(45) Date of Patent: Mar. 1, 2016

(54) SYSTEMS AND METHODS FOR MULTI-RATE DIGITAL SELF-INTERFERENCE CANCELLATION

(71) Applicant: Kumu Networks, Inc., Sunnyvale, CA (US)

(72) Inventors: Dinesh Bharadia, Sunnyvale, CA (US); Jung-Il Choi, Sunnyvale, CA (US); Mayank Jain, Sunnyvale, CA (US); Rajendra Tushar Moorti, Sunnyvale, CA (US)

(73) Assignee: KUMU Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/722,087

(22) Filed: May 26, 2015

(65) Prior Publication Data

US 2015/0341125 A1 Nov. 26, 2015

Related U.S. Application Data

(60) Provisional application No. 62/002,578, filed on May 23, 2014.

(51) Int. Cl.
*H04B 15/00* (2006.01)
*H04L 5/14* (2006.01)
*H04B 1/38* (2015.01)

(52) U.S. Cl.
CPC ............... *H04B 15/00* (2013.01); *H04B 1/38* (2013.01); *H04L 5/14* (2013.01)

(58) Field of Classification Search
CPC ... H04L 5/1461; H04L 25/03006; H04L 5/14; G10L 21/0208; G10L 21/0232; H03H 21/0012; H03H 2021/0078; H04M 9/082; H04B 1/7103; H04B 3/237; H04B 7/15578; H04B 15/00; H04B 1/38; H04J 11/002
USPC ............. 375/229, 230, 316, 346; 379/406.01, 379/406.05, 406.06, 406.08, 3; 455/70, 455/570; 370/276, 282, 286, 290
See application file for complete search history.

(56) References Cited

U.S. PATENT DOCUMENTS

| 4,952,193 A | 8/1990 | Talwar |
| 5,691,978 A | 11/1997 | Kenworthy |

(Continued)

FOREIGN PATENT DOCUMENTS

| EP | 0755141 B1 | 10/2005 |
| EP | 1959625 B1 | 2/2009 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

*Primary Examiner* — Vineeta Panwalkar
(74) *Attorney, Agent, or Firm* — Jeffrey Schox; Thomas Gwinn

(57) ABSTRACT

A system for multi-rate digital self-interference cancellation including a signal component generation system coupled to a digital transmit signal of a communication system that generates a set of signal components from the digital transmit signal; a multi-rate adaptive filter that transforms the set of signal components into a digital self-interference cancellation signal, according to a transform configuration, to form an interference-reduced receive signal; and a transform adaptor that dynamically sets the transform configuration in response to changes in the interference-reduced receive signal.

22 Claims, 10 Drawing Sheets

(56) References Cited

U.S. PATENT DOCUMENTS

| | | |
|---|---|---|
| 5,734,967 A | 3/1998 | Kotzin et al. |
| 5,790,658 A | 8/1998 | Yip et al. |
| 5,930,301 A | 7/1999 | Chester et al. |
| 6,215,812 B1 | 4/2001 | Young et al. |
| 6,411,250 B1 | 6/2002 | Oswald et al. |
| 6,567,649 B2 | 5/2003 | Souissi |
| 6,639,551 B2 | 10/2003 | Li et al. |
| 6,725,017 B2 | 4/2004 | Blount et al. |
| 6,778,599 B1 * | 8/2004 | Doron ............... 375/232 |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,869,527 B2 | 1/2011 | Vetter et al. |
| 8,055,235 B1 | 11/2011 | Gupta et al. |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 2002/0064245 A1 | 5/2002 | McCorkle |
| 2003/0031279 A1 | 2/2003 | Blount et al. |
| 2003/0099287 A1 | 5/2003 | Arambepola |
| 2003/0112860 A1 * | 6/2003 | Erdogan ............... 375/229 |
| 2003/0148748 A1 | 8/2003 | Shah |
| 2004/0106381 A1 | 6/2004 | Tiller |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0254555 A1 | 11/2005 | Teague |
| 2005/0282500 A1 | 12/2005 | Wang et al. |
| 2007/0018722 A1 | 1/2007 | Jaenecke |
| 2007/0249314 A1 | 10/2007 | Sanders et al. |
| 2007/0274372 A1 | 11/2007 | Asai et al. |
| 2008/0107046 A1 | 5/2008 | Kangasmaa et al. |
| 2008/0131133 A1 | 6/2008 | Blunt et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0180404 A1 | 7/2009 | Jung et al. |
| 2009/0186582 A1 | 7/2009 | Muhammad et al. |
| 2009/0303908 A1 | 12/2009 | Deb et al. |
| 2010/0014600 A1 | 1/2010 | Li et al. |
| 2010/0022201 A1 | 1/2010 | Vandenameele |
| 2010/0056166 A1 | 3/2010 | Tenny |
| 2010/0117693 A1 | 5/2010 | Lorg et al. |
| 2010/0150033 A1 | 6/2010 | Zinser et al. |
| 2010/0159858 A1 | 6/2010 | Dent et al. |
| 2010/0165895 A1 * | 7/2010 | Elahi et al. ............... 370/290 |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0149714 A1 | 6/2011 | Rimini et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0256857 A1 | 10/2011 | Chen et al. |
| 2011/0268232 A1 | 11/2011 | Park et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0155913 A1 | 6/2013 | Sarca |
| 2013/0166259 A1 | 6/2013 | Weber et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0301487 A1 | 11/2013 | Khandani |
| 2013/0301488 A1 | 11/2013 | Hong et al. |
| 2014/0169236 A1 | 6/2014 | Choi et al. |
| 2014/0206300 A1 | 7/2014 | Hahn et al. |
| 2014/0219139 A1 | 8/2014 | Choi et al. |
| 2014/0348018 A1 | 11/2014 | Bharadia et al. |

FOREIGN PATENT DOCUMENTS

| | | |
|---|---|---|
| EP | 2267946 A2 | 12/2010 |
| RU | 2256985 C2 | 7/2005 |
| WO | 2013185106 A1 | 12/2013 |
| WO | 2014093916 A1 | 6/2014 |

* cited by examiner

SYSTEMS AND METHODS FOR MULTI-RATE DIGITAL SELF-INTERFERENCE CANCELLATION

CROSS-REFERENCE TO RELATED APPLICATIONS

This application claims the benefit of U.S. Provisional Application Ser. No. 62/002,578, filed on 23 May 2014, which is incorporated in its entirety by this reference.

TECHNICAL FIELD

This invention relates generally to the wireless communications field, and more specifically to new and useful systems and methods for multi-rate digital self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, solutions intended to address self-interference often fall short in cancellation performance in the digital domain. Thus, there is a need in the wireless communications field to create new and useful systems and methods for multi-rate digital self-interference cancellation. This invention provides such new and useful systems and methods.

BRIEF DESCRIPTION OF THE FIGS

Figure 5:
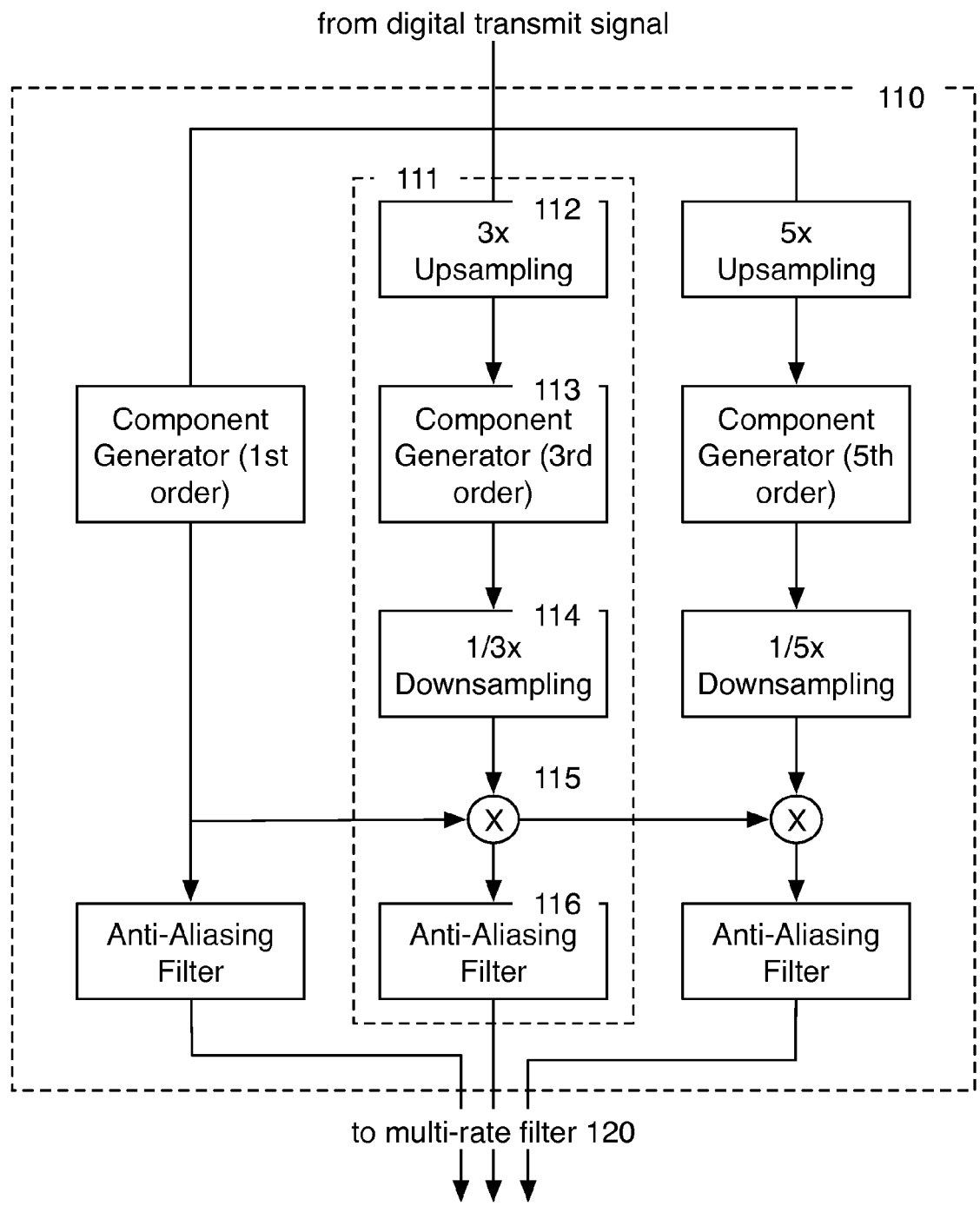
Figure 6:
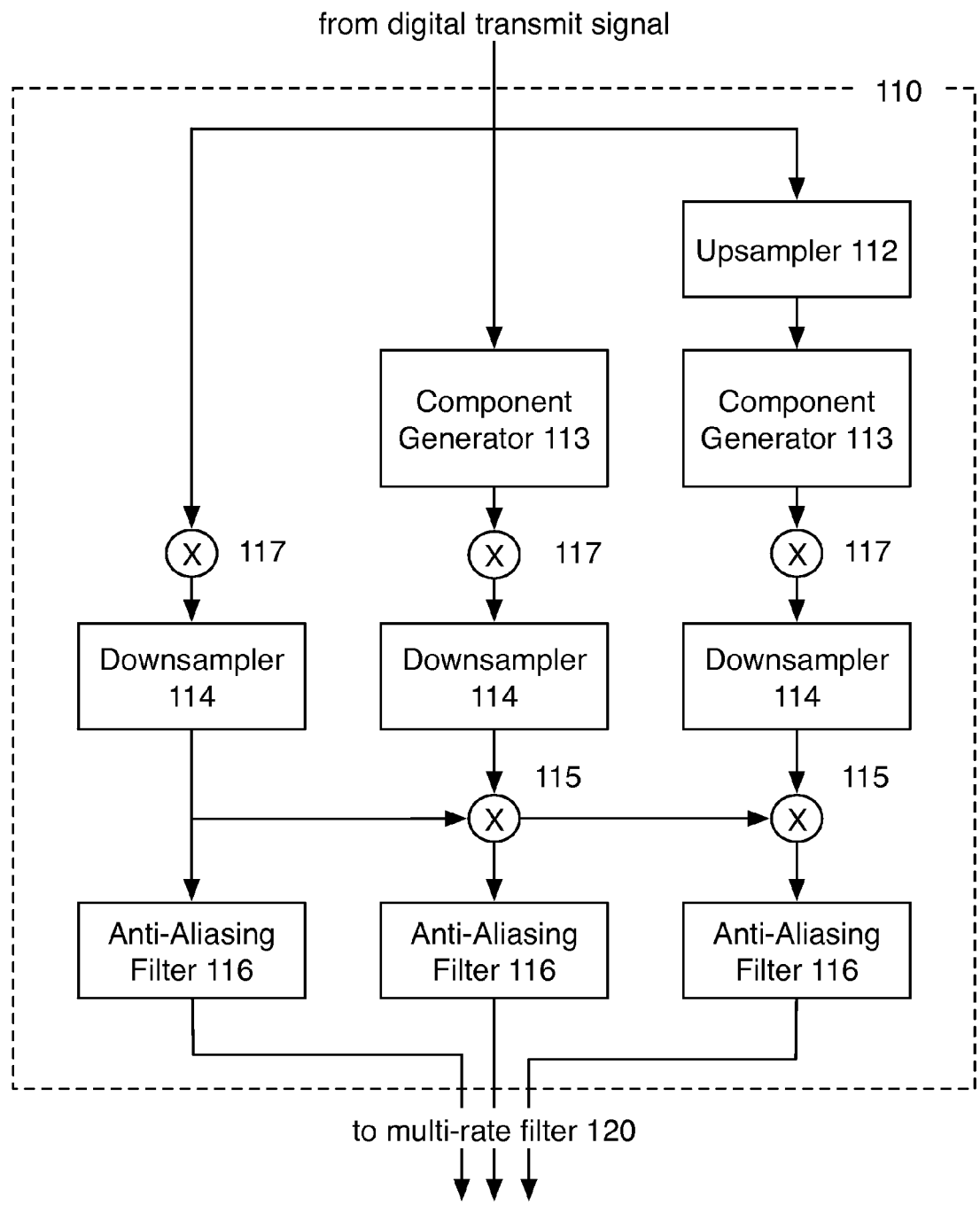
Figure 7:
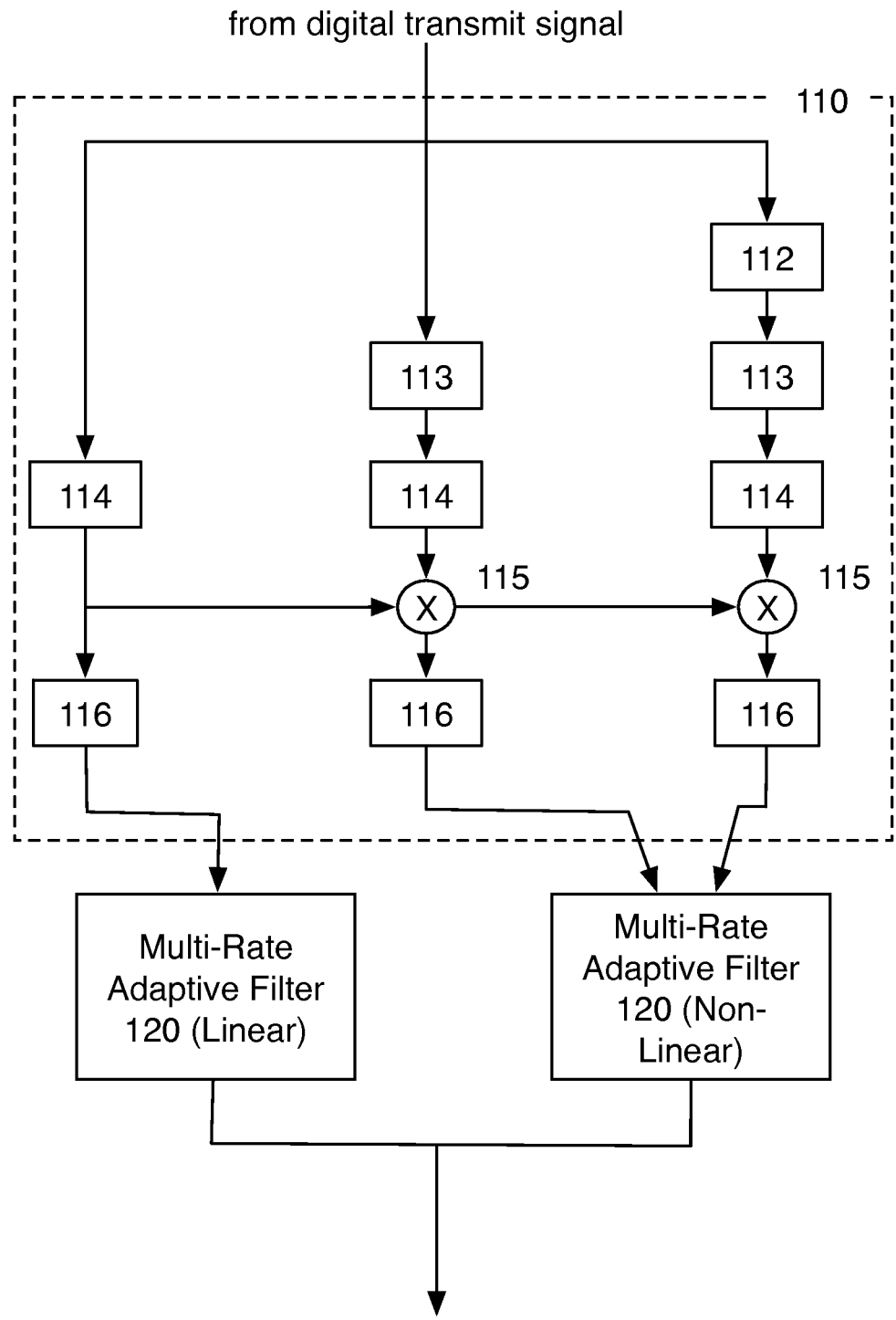
Figure 8:
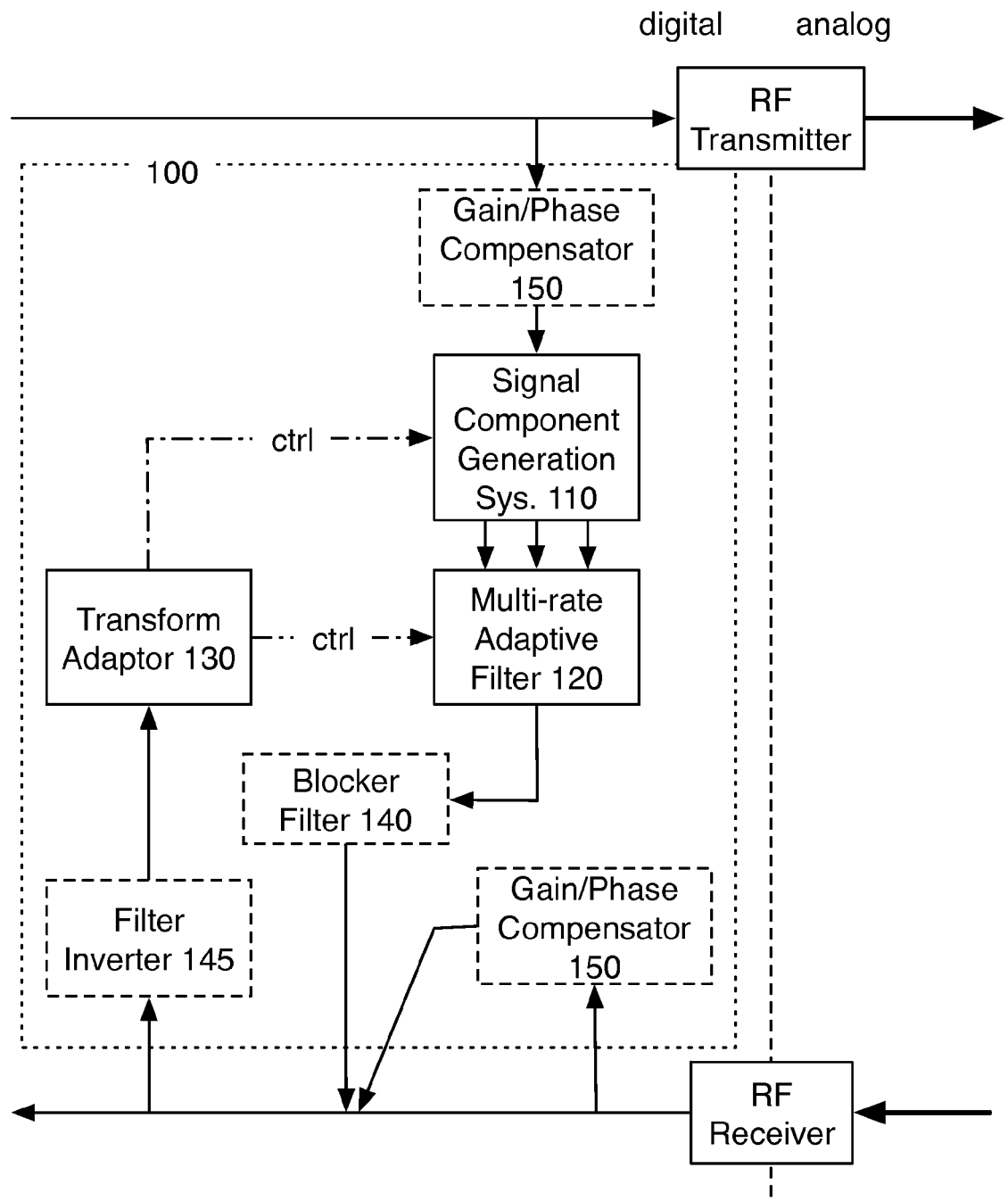

FIGS. 4A, 4B, 4C, and 4D are diagram representations of system inputs and outputs of a preferred embodiment;

FIG. 5 is a diagram representation of a component generation system of a system of a preferred embodiment;

FIG. 6 is a diagram representation of a component generation system of a system of a preferred embodiment;

FIG. 7 is a diagram representation of a subsystem of a preferred embodiment;

FIG. 8 is a diagram representation of a system of a preferred embodiment; and

Figure 9:
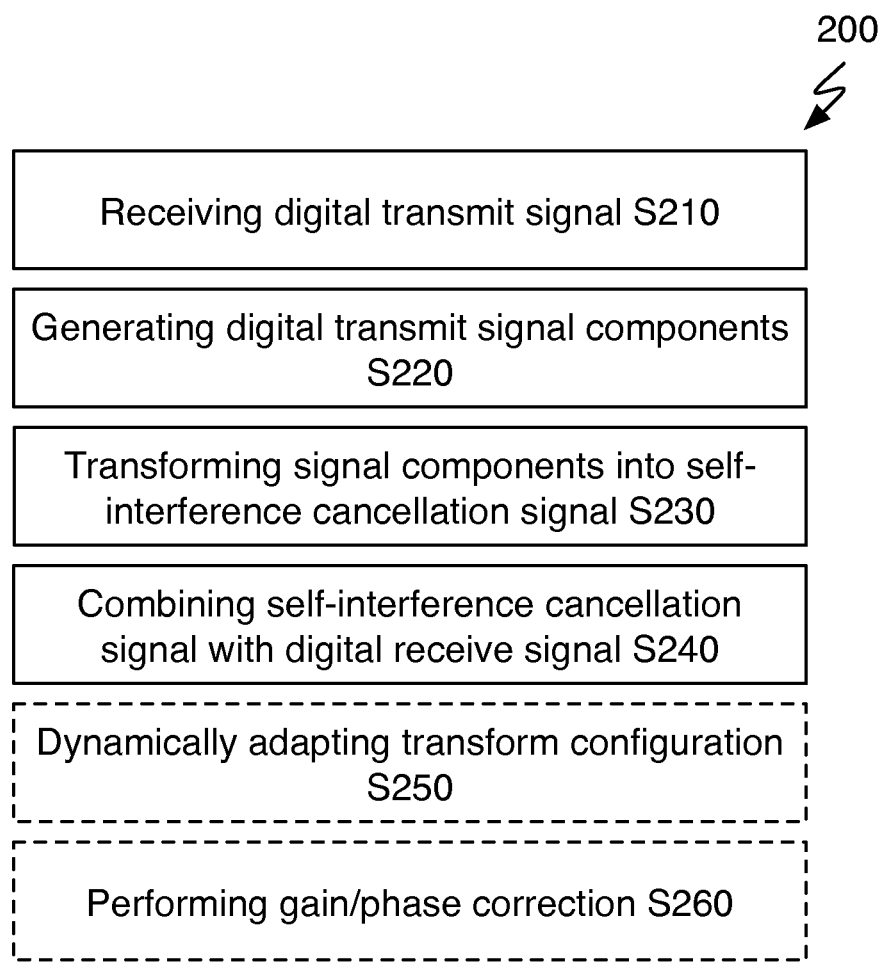

FIG. 9 is a flowchart representation of a method of a preferred embodiment.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource a scarcer one. As a result, spectral efficiency has become increasingly important to wireless communications systems.

One promising solution for increasing spectral efficiency is found in full-duplex wireless communications systems; that is, wireless communications systems that are able to transmit and receiving wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals or as RF analog signals, but full-duplex transceivers may additionally or alternatively sample transmission output in any suitable manner. This sampled transmission output may be used by full-duplex transceivers to remove interference from received wireless communications data (e.g., as RF analog signals or baseband digital signals). In many full-duplex transceivers, the digital cancellation system functions by imposing a scaled version of the transmitted digital baseband signal on the received baseband signal and the analog cancellation system functions by imposing a scaled version of the transmitted RF analog signal on the received RF analog signal. This architecture is generally effective for reducing interference when transceiver components are operating in a linear regime, but fails to account for signal non-linearities arising from the conversion of data to transmitted RF signal and vice-versa. These non-linearities may become more pronounced as transmitter/receiver power are increased; as a result, a full-duplex transceiver without effective non-linear interference cancellation may be limited in power range by performance issues.

Figure 1:
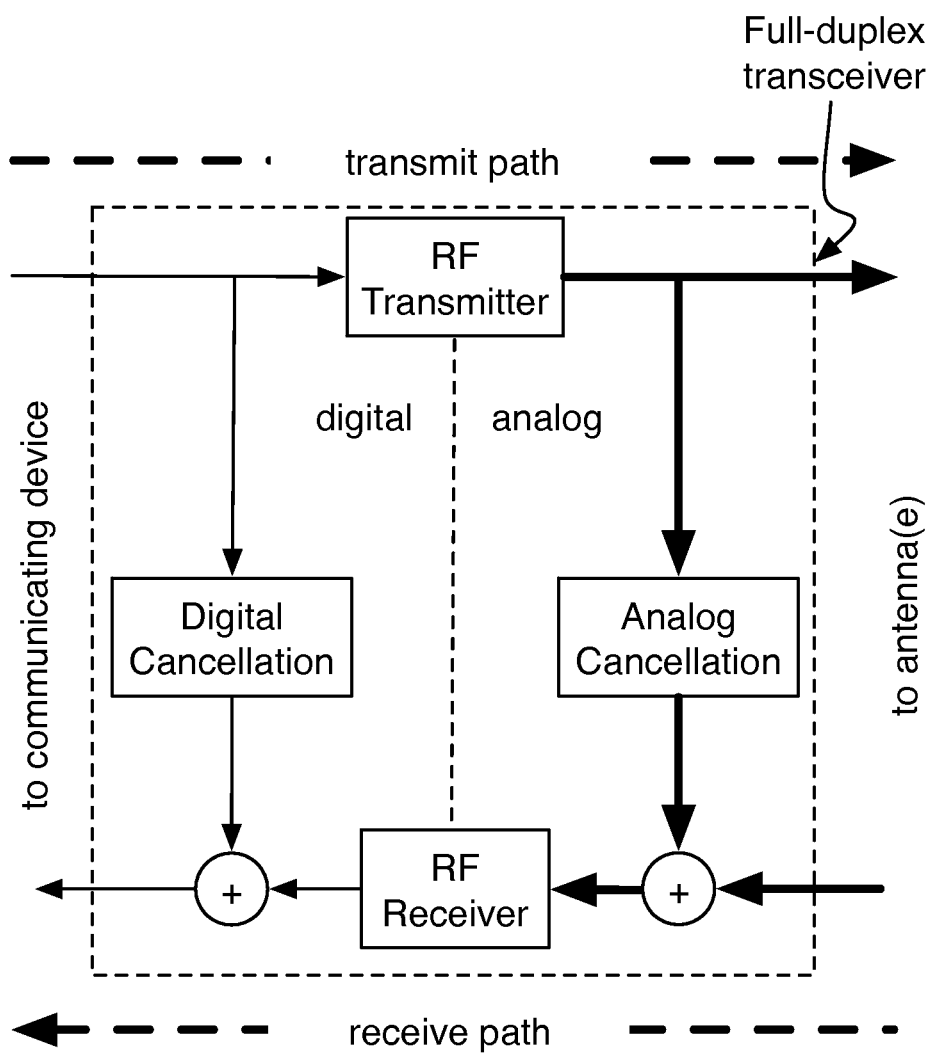
FIG. 1 is a diagram representation of full-duplex radio including digital and analog self-interference cancellation.

The systems and methods described herein increase the performance of full-duplex transceivers as shown in FIG. 1 (and other applicable systems) by providing for multi-rate digital self-interference cancellation. Other applicable systems include active sensing systems (e.g., RADAR), wired communications systems, wireless communications systems, and/or any other suitable system, including communications systems where transmit and receive bands are close in frequency, but not overlapping.

2. System for Multi-Rate Digital Self-Interference Cancellation

Figure 2:
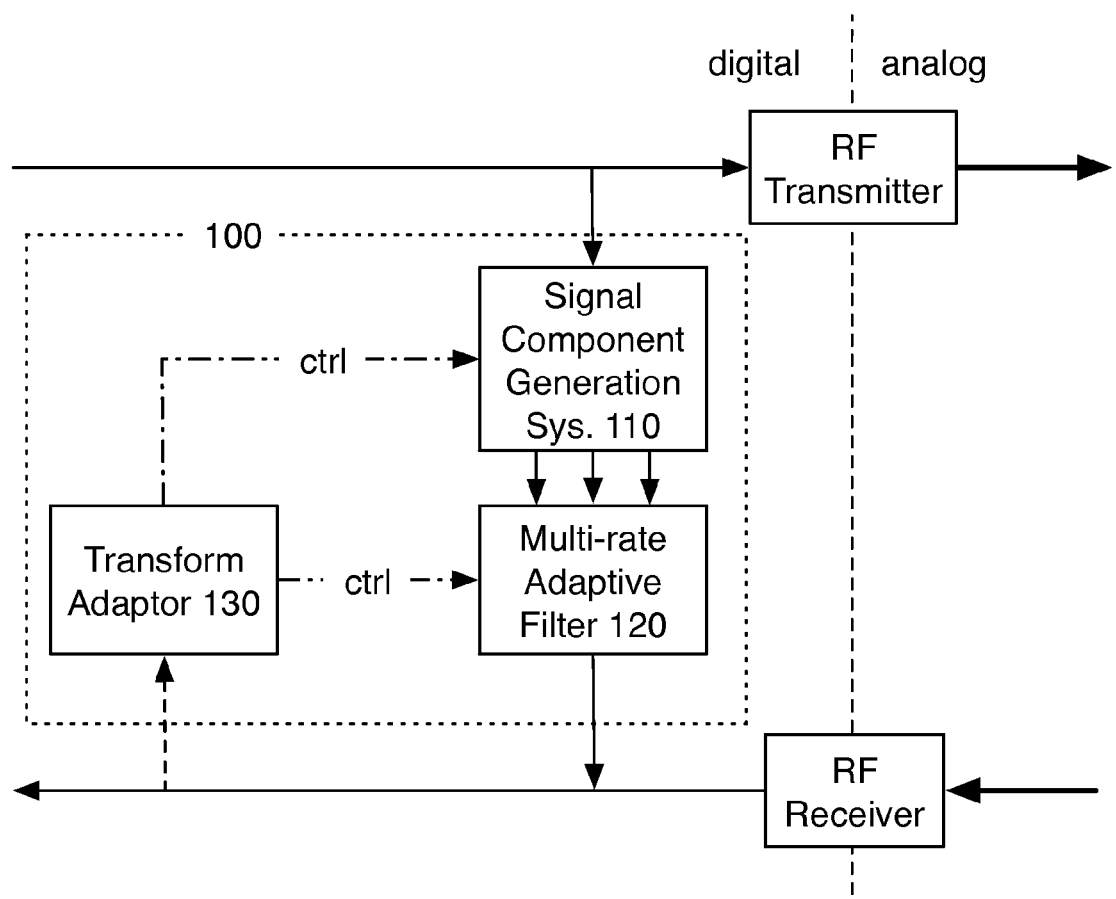
FIG. 2 is a diagram representation of a system of a preferred embodiment.
Figure 3:
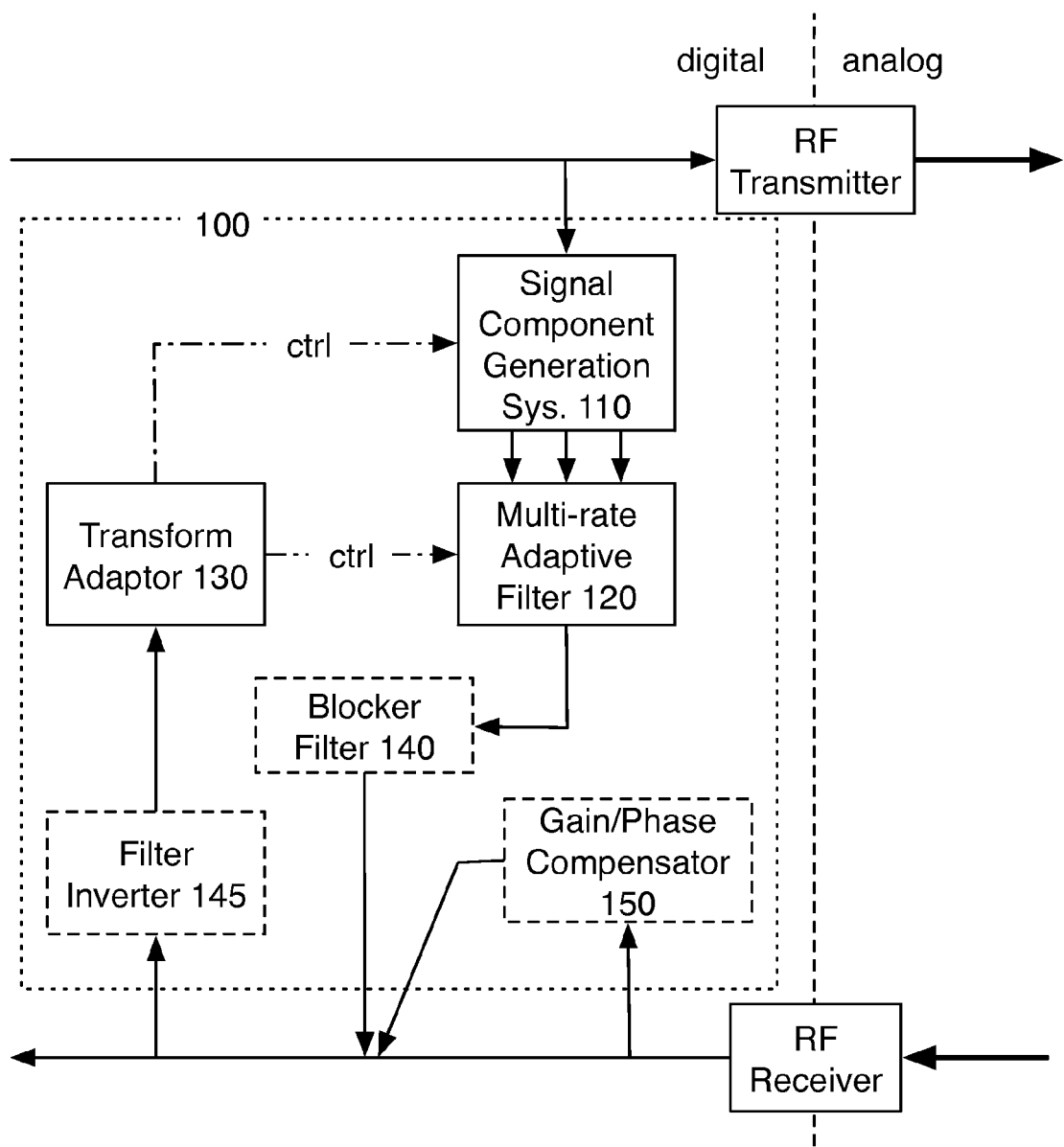
FIG. 3 is a diagram representation of a system of a preferred embodiment.

As shown in FIG. 2 and FIG. 3, a system 100 for multi-rate digital self-interference cancellation includes a signal component generation system 110, a multi-rate adaptive filter 120, and a transform adaptor 130. The system 100 may additionally or alternatively include a blocker filter 140, a filter inverter 145, and/or a gain/phase compensator 150.

The system 100 functions to reduce self-interference in full-duplex wireless communications systems by enacting multi-rate digital self-interference cancellation upon signals (digital or analog) received by the communications systems. Multi-rate digital self-interference cancellation may improve the performance of full-duplex wireless communications systems in numerous operating modes; particularly in operating modes where components of the full-duplex wireless communications systems are operating in substantially non-linear regimes (e.g. operating modes designed to maximize transmission power, power efficiency, etc.). The system 100 reduces self-interference by passing a digital transmit signal through the signal component generation system 110, which generates a set of transmit signal components that are weighted and combined by the multi-rate adaptive filter 120 (according to a transform configuration set by the transform adaptor 130 to form a digital self-interference cancellation signal. The digital self-interference cancellation signal is then combined with a receive signal originating from an RF receiver to cancel self-interference present in the receive signal.

The system 100 may be implemented using a general purpose processor, a digital signal processor, an application specific integrated circuit (ASIC), a field programmable gate array (FPGA) and/or any suitable processor(s) or circuit(s). The system 100 preferably includes memory to store configuration data, but may additionally or alternatively be configured using externally stored configuration data or in any suitable manner.

The system 100 is preferably implemented as part of a full-duplex radio. Additionally or alternatively, the system 100 may be implemented as active sensing systems (e.g., RADAR), wired communications systems, wireless communications systems, and/or any other suitable system, including communications systems where transmit and receive bands are close in frequency, but not overlapping.

Figure 4A:
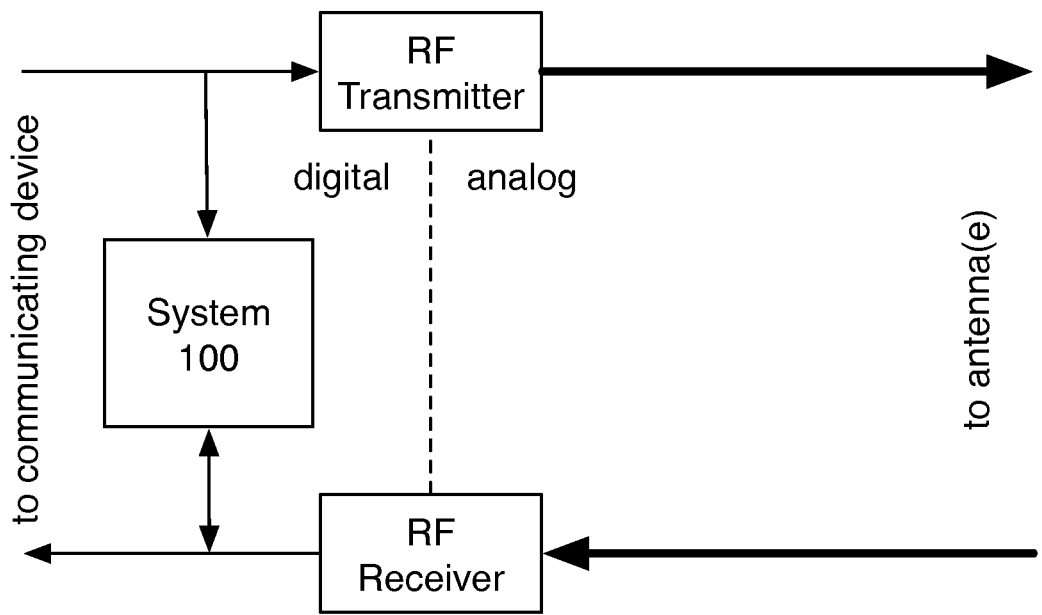
Figure 4B:
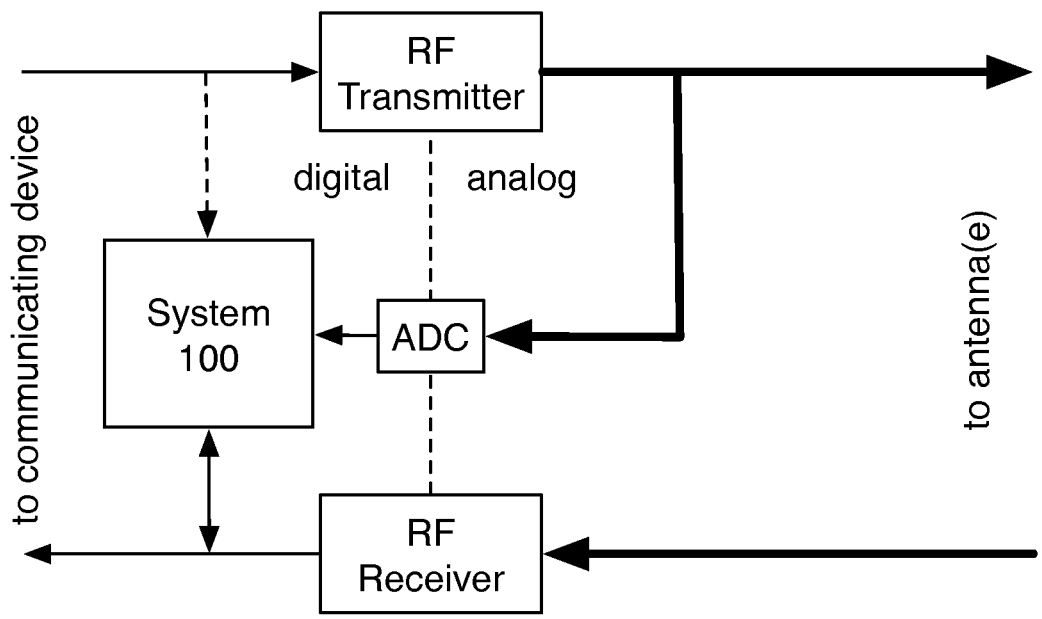
Figure 4C:
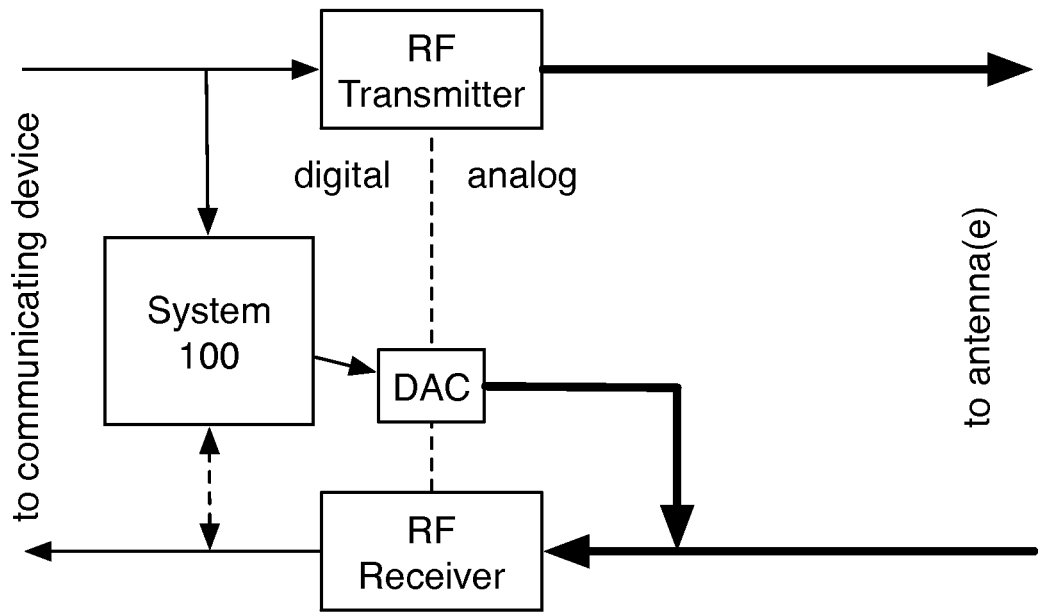
Figure 4D:
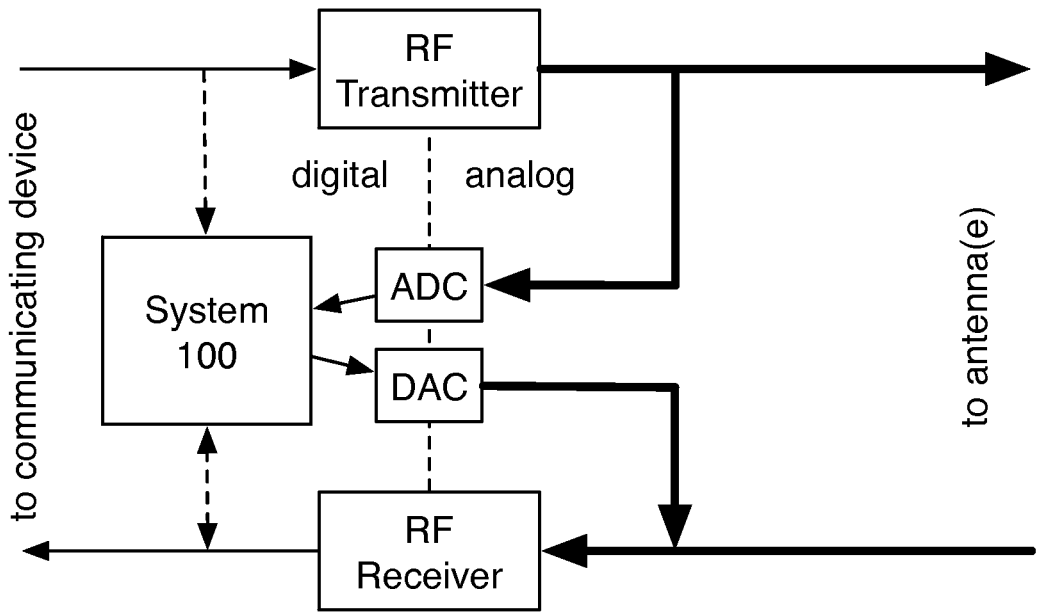

The system 100 preferably samples digital transmit signals as input for the signal component generation system 110, as shown in FIG. 4A and FIG. 4C. Digital transmit signals sampled by the system 100 preferably include digital signals originating from an electronic device, destined for an analog transmitter of a full-duplex radio (or other full-duplex wireless communications system). Digital transmit signals sampled by the system 100 may additionally or alternatively include digital transmit signals converted from analog transmit signals (e.g., via an analog-to-digital converter), as shown in FIG. 4B and FIG. 4D.

Digital transmit signals sampled by the system 100 are preferably encoded for conversion to an analog signal by an RF transmitter, (e.g., encoded via PSK, QAM, OFDM, etc.) but may additionally or alternatively be encoded in any suitable way.

The system 100 preferably combines the digital self-interference cancellation signal produced by the system 100 with a digital receive signal of a communications system, as shown in FIGS. 4A and 4B. Digital receive signals preferably include digital signals received from an analog receiver of a full-duplex radio (or other full-duplex wireless communications system), destined for a computer or other communications system. Additionally or alternatively, the system 100 may combine the digital self-interference cancellation signal with an analog signal (e.g., before the receiver, via a digital-to-analog converter), as shown in FIGS. 4C and 4D.

The signal component generation system 110 functions to generate a set of signal components from the sampled transmit signal (or signals) that may be used by the multi-rate adaptive filter 120 to generate a self-interference cancellation signal.

The signal component generation system 110 preferably samples digital transmit signals corresponding to a native sampling rate. Additionally or alternatively, the signal component generation system 110 may sample a subset of digital transmit signal data; for instance, if a digital transmit signal has a native sample rate of 40 MHz, the signal component generation system 110 might discard every other sample, corresponding to a sample rate of 20 MHz (while the RF transmitter may still receive all samples, corresponding to a sample rate of 40 MHz). The signal component generation system 110 may additionally or alternatively interpolate digital transmit signals to increase or decrease sampling rate. In one instance, the signal component generation system 110 modifies the sampling rate of a digital transmit signal to match a sampling rate of an RF receiver of a full-duplex radio.

In sampling the digital transmit data, the signal component generation system 110 may perform pre-processing to prepare sampled digital transmit signals for component generation. The signal component generation system 110 may include various operators for pre-processing such as scaling, shifting, and/or otherwise modifying the digital transmit signals.

In one implementation, the signal component generation system 110 modifies sampled digital transmit signals by removing information unlikely to substantially affect the output of the multi-rate adaptive filter 120. This may include, for instance, dropping samples if the samples do not represent a change above some change threshold from previous samples. As another example, if digital transmit signals correspond to a particular amplitude of an output analog signal, only digital signal data corresponding to an amplitude above some amplitude threshold may be passed to the multi-rate adaptive filter 120.

If the signal component generation system 110 receives digital transmit signals from more than one source (e.g. from both the digital transmit line before the RF transmitter and the analog transmit line after the RF transmitter via an ADC), the signal component generation system 110 may additionally or alternatively combine the signals in any suitable way or may select one signal over another. For instance, the signal component generation system 110 may pass the average of the two signals to the adaptive multi-rate filter 120. As another example, the signal component generation system no may prefer the analog signal sampler originating digital transmit signal over the transmit-path digital transmit signal above a certain transmitter power, and vice versa at or below that transmitter power. The selection and combination of the two signals may be dependent on any suitable condition.

The signal component generation system 110 preferably generates a set of signal components that may be weighted and combined by the multi-rate adaptive filter 120 in order to generate a self-interference cancellation signal. The self-interference cancellation signal is based upon a hypothesized contribution of self-interference to a received signal. Self-interference contributions may result from a variety of sources, including components in both RF receivers and RF transmitters of full-duplex radios (e.g., mixers, power amplifiers, ADCs, DACs, etc.). Further, self-interference contributions may vary randomly, or with environmental or input conditions (e.g. transmission power, ambient temperature, etc.).

The signal component generation system 110 preferably generates transmit signal components according to mathematical models adapted to model self-interference contributions of the RF transmitter, RF receiver, and/or other sources. The signal component generation system 110 preferably generates a set of signal components intended to be used with a specific mathematical model (e.g., generalized memory polynomial (GMP) models, Volterra models, and Wiener-Hammerstein models); additionally or alternatively, the signal component generation system may generate a set of signal components usable with multiple mathematical models.

Signal component sets may additionally or alternatively be chosen based on comparisons of sampled digital transmit signals to received signals (from the receive path or any other suitable source). Signal component sets may be generated from previously known models or may be created using neural network and/or machine learning techniques.

For example, a general form of a GMP model is as follows:

$$\sum_k c_{nk} x[n] |x[n]|^{k-1} +$$
$$\sum_k c_{nk} x[n] |x[n-m-l]|^{k-1} + \sum_k c_{nk} x[n] |x[n-m+l]|^{k-1}$$

where the input signal is represented by $x[n]$ and $c_{nk}$ represents coefficients of the GMP. The first sum of the GMP captures self-interference effects occurring based on current values of the input signal, while the second two terms capture self-interference effects determined by past values of the input signal (known as memory effects).

A signal component generation system 110 configured to generate a signal component set according to this GMP model might generate signal components by output order; for example, a first signal component might simply be $x[n]$, while a second signal component may be $x[n]|x[n]|$, a third signal component may be $x[n]|x[n]|^2$, and so on. Such a signal component set might have N components (the Nth component represented as $x[n]|x[n]|^{N-1}$, where N is an integer).

For mathematical models that do use higher order terms, the bandwidth of terms of order k are generally k times larger than the bandwidth of the input signal; for example, if an input signal $x[n]$ has a bandwidth of 40 MHz, the third order terms (e.g., $x[n]|x[n-m]|^2$) will occupy a bandwidth of 120 MHz. To avoid issues arising from aliasing, the input signal is preferably sampled at a sampling rate of 120 MHz (three times more than an initial Nyquist sampling rate of 40 MHz). As the number of terms increase, so does the ability to model non-linear self-interference effects, but so also does the minimum sampling rate to avoid aliasing. This presents another issue; the RF transmitter may also have to match this increased sampling rate in order to subtract non-linear digital interference signals from received signals. For example, if a GMP model uses $7^{th}$ order terms, for the same 40 MHz transmit signal the RF receiver may have to sample the received signal at a rate of 280 MHz to avoid aliasing issues (and likewise, the transmit signal may have to be sampled at the same rate).

In one embodiment of the invention, the signal component generation system 110 addresses these issues by separating components at least partially according to component order (e.g., one component containing $x[n]$ terms, another component containing $x[n]|x[n-m]|^2$ terms). The preferred result of this separation is that the sampling rate necessary for each model component to avoid aliasing is known as a function of component order. In this embodiment, the signal component generation system no includes a number of transform paths 111, each of which may include an upsampler 112, a component generator 113, a downsampler 114, a signal multiplier 115, and/or an anti-aliasing filter (AAF) 116, as shown in FIG. 5.

When a digital transmit signal is passed to a transform path 111, the transform path 111 may first upsample the digital transmit signal by passing it to the upsampler 112.

The upsampler 112 functions to increase the number of samples contained within the digital transmit signal in order to reduce aliasing effects. Note that for first order signal components, upsampling may not be necessary. The upsampler 112 preferably increases the number of samples contained within a digital transmit signal component according to linear interpolation, but may additionally or alternatively use any suitable method. In one example, the upsampler 112 upsamples a digital transmit signal component by creating a sequence comprising the original samples separated by L-1 zeroes (where L is the upsampling factor) and then passing the new signal through a finite impulse response (FIR) low-pass filter. In another example, the upsampler 112 creates a sequence comprising the original samples separated from each other by L-1 new samples, where each new sample is modeled on how a DAC converts digital samples to an analog signal (e.g. if the output of the DAC is not exactly linear between outputs). For a transform path 111 (and component generator 113) of order k, the upsampler 112 preferably upsamples the digital transmit signal with an upsampling factor of k, but may additionally or alternatively upsample the digital transmit signal by any suitable factor.

The component generator 113 functions to create the transmit signal component desired for a particular transform path 111. For example, a signal component generated for order 3 of a GMP model might be generated as $$x[n]|x[n]|^2 + x[n]|x[n-m]|^2$$

The component generator 113 preferably generates signal components of a single order only, but may additionally or alternatively generate components of multiple orders (e.g., $x[n]|x[n]|^2 + x[n]|x[n]|^4$). The component generator 113 preferably generates signal components according to a generalized memory polynomial (GMP) model, Volterra model, Wiener-Hammerstein model, or neural network model, but may additionally or alternatively use a part or whole of any suitable model or combination of models.

In some cases, the component generator 113 may simply pass a copy of a sampled transmit signal unmodified; this may be considered functionally equivalent to a component generator 113 not being explicitly included for that particular transform path 111 (as shown in FIG. 6). This may be referred to as a first order component generator.

The downsampler 114 functions to reduce the number of samples contained within a signal component generated by a component generator 113. The downsampler 114 preferably downsamples signal components by simply removing signals at a particular interval (e.g., throwing away every other sample to halve the number of samples) but may additionally or alternatively downsample signal components by any suitable method. The downsampler 114 preferably downsamples signal components to match the sampling rate of the received digital baseband signal, but may additionally or alternatively downsample signal components to any suitable sampling rate.

Note that sampling rates of transform path 111 inputs and outputs need not necessarily be equal to each other; likewise, sampling rates across transform paths 111 need not necessarily be equal. The system 100 preferably includes performing self-interference cancellation at multiple sampling rates (i.e., multi-rate self-interference cancellation).

The signal multiplier 115 functions to allow for combination of signal components. The signal multiplier 115 preferably performs weighted signal combination (e.g., Output Signal=Transform Path Signal+0.2*Multiplier Input Signal), but may additionally or alternatively combine signal components in any suitable manner. The signal multiplier 115 may be located at any point within a transform path 111 and may take any signals as input.

In a variation of a preferred embodiment, the signal component generation system 110 does not include any signal multipliers 115.

The anti-aliasing filter (AAF) 116 functions to reduce the bandwidth of signal components to prepare the signal components for processing by the multi-rate adaptive filter 120. The AAF 116 is preferably a digitally implemented FIR low-pass filter, but may additionally or alternatively be any suitable type of filter (e.g., infinite impulse response (IIR) filters, fourier-transform based filters). The AAF 116 preferably reduces the bandwidth of signal components to match the bandwidth of the digital baseband signal received from the RF transmitter, but may additionally or alternatively function to cap the bandwidth of signal components at any value below the maximum bandwidth of all signal components produced by component generators 113. The AAF 116 preferably functions to remove non-linear interference signal components not found in the received baseband signal (e.g., if the RF receiver has a corresponding lowpass filter for the baseband analog or digital signals or potentially a corresponding bandpass filter for the RF signal).

In a variation of a preferred embodiment, the signal component generation system includes one or more frequency shifters 117. The frequency shifters 117 function to shift the frequency of signal components. Frequency shifting is preferably performed by multiplying the input signal with $e^{-j\omega n}$ where n is the digital sample and $\omega$ is a frequency of the band in which self-interference cancellation is to be performed. By shifting the operating frequency of the signal components, interference signals that are present in other frequency bands (e.g., adjacent and/or close to the transmit frequency band) can be estimated and removed from the signal. Similarly to signal multipliers 115, frequency shifters 117 may be located at any point within a transform path 111.

The signal component generation system 110 preferably transmits signal components without combining them to the multi-rate adaptive filter 120 (aside from combination resulting from signal multipliers 150); additionally or alternatively, signal components may be added, averaged, and/or combined in any suitable manner (e.g. scaling components before adding them and/or combining components multiplicatively).

The multi-rate adaptive filter 120 functions to generate a self-interference cancellation signal from the signal components produced by the signal component generation system 110. In some implementations, the multi-rate adaptive filter 120 may additionally function to perform sampling rate conversions (a la the upsampler 112 and/or downsampler 114).

The multi-rate adaptive filter 120 preferably generates a self-interference cancellation signal by combining a weighted sum of signal components according to mathematical models adapted to model self-interference contributions of the RF transmitter, RF receiver, and/or other sources. Examples of mathematical models that may be used by the multi-rate adaptive filter 120 include generalized memory polynomial (GMP) models, Volterra models, and Wiener-Hammerstein models; the multi-rate adaptive filter 120 may additionally or alternatively use any combination or set of models.

The multi-rate adaptive filter 120 may additionally or alternatively use generated mathematical models for modeling self-interference contributions based on comparisons of sampled digital transmit signals to received signals (from the receive path or any other suitable source). These models may be generated from previously known models or may be created using neural network and/or machine learning techniques.

The multi-rate adaptive filter 120 preferably performs self-interference cancellation signal generation according to a transform configuration set dynamically by the transform adaptor 130 (discussed in more detail in sections covering the transform adaptor 130. Additionally or alternatively, the multi-rate adaptive filter may combine signal components in any manner in order to generate a self-interference cancellation signal.

The system 100 preferably includes a single multi-rate adaptive filter 120, but may additionally or alternatively include multiple multi-rate adaptive filters 120. For example, the system 100 may include one multi-rate adaptive filter 120 for linear self-interference cancellation and one for non-linear self-interference cancellation, as shown in FIG. 7. Signal components may be transmitted to multiple multi-rate adaptive filters 120 in any manner (including some or all signal components going to multiple multi-rate adaptive filters 120.

If the system 100 includes multiple multi-rate adaptive filters 120, the output of these filters may be combined in any manner to generate a self-interference cancellation signal.

The transform adaptor 130 functions to set the transform configuration of the multi-rate adaptive filter 120. The transform adaptor 130 may additionally or alternatively set configuration of the signal component generation system 110.

The transform configuration preferably includes the type of model or models used by the multi-rate adaptive filter 120 as well as configuration details pertaining to the models (each individual model is a model type paired with a particular set of configuration details). For example, one transform configuration might set the multi-rate adaptive filter 120 to use a GMP model with a particular set of coefficients. If the model type is static, the transform configuration may simply include model configuration details; for example, if the model is always a GMP model, the transform configuration may include only coefficients for the model, and not data designating the model type.

The transform configuration may additionally or alternatively include other configuration details related to the signal component generation system 110 and/or the multi-rate adaptive filter 120. For example, if the signal component generation system 110 includes multiple transform paths 111, the transform adaptor 130 may set the number of these transform paths 111, which model order their respective component generators 113 correspond to, the type of filtering used by AAFs 116, and/or any other suitable details. In general, the transform configuration may include any details relating to the computation or structure of the signal component generation system 110 and/or the multi-rate adaptive filter 120.

Transform configurations are preferably selected and/or generated by the transform adaptor 130. The transform adaptor 130 may set an appropriate transform configuration by selecting from stored static configurations, from generating configurations dynamically, or by any other suitable manner or combination of manners. For example, the transform adaptor 130 may choose from three static transform configurations based on their applicability to particular signal and/or environmental conditions (the first is appropriate for low transmitter power, the second for medium transmitter power, and the third for high transmitter power). As another example, the transform adaptor 130 may dynamically generate configurations based on signal and/or environmental conditions; the coefficients of a GMP model are set by a formula that takes transmitter power, temperature, and receiver power as input.

The transform adaptor 130 preferably sets transform configurations based on a variety of input data (whether transform configurations are selected from a set of static configurations or generated according to a formula or model). Input data used by the transform adaptor 130 may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal). The transform adaptor 130 may additionally or alternatively generate and/or use models based on this input data to set transform configurations; for example, a transmitter manufacturer may give a model to predict internal temperature of the transmitter based on transmitter power, and the transform adaptor 130 may use the output of this model (given transmitter power) as input data for setting transform configurations.

The transform adaptor 130 may set transform configurations at any time, but preferably sets transform configurations in response to either a time threshold or other input data threshold being crossed. For example, the transform adaptor 130 may re-set transform configurations every ten seconds according to changed input data values. As another example, the transform adaptor 130 may re-set transform configurations whenever transmitter power thresholds are crossed (e.g. whenever transmitter power increases by ten percent since the last transform configuration setting, or whenever transmitter power increases over some static value).

If the system 100 is connected to a full-duplex wireless communications system also having an analog canceller, the transform adaptor 130 may cooperate with the analog canceller (for instance, setting transform configurations based on data from the analog canceller, or coordinating transform configuration setting times with the analog canceller) to reduce overall self-interference (or for any other suitable reason).

The transform adapter 130 preferably adapts transform configurations and/or transform-configuration-generating algorithms (i.e., algorithms that dynamically generate transform configurations) to reduce self-interference for a given transmit signal and set of system/environmental conditions. The transform adapter 130 may adapt transform configurations and/or transform-configuration-generating algorithms using analytical methods, online gradient-descent methods (e.g., LMS, RLMS), and/or any other suitable methods. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

The transform adaptor 130 may adapt transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, the transform adaptor 130 may adapt transform configurations based on historical received data (e.g. what the signal looked like ten seconds ago) or any other suitable information. The transform adaptor 130 may additionally or alternatively adapt transform configurations based on the content of the transmitted signal; for instance, if the transmitted signal is modulated in a particular way, the transform adaptor 130 may look for that same modulation in the self-interference signal; more specifically, the transform adaptor 130 may adapt transform configurations such that when the self-interference signal is combined with the digital receive signal the remaining modulation (as an indicator of self-interference) is reduced (compared to a previous transform configuration).

The blocker filter 140 functions to remove unwanted higher order terms in the self-interference cancellation signal generated by the multi-rate adaptive filter 120. The blocker filter 140 may be especially useful in reducing unwanted signals not eliminated by the AAFs 116. The blocker filter 140 is preferably a digitally implemented FIR lowpass filter, but may additionally or alternatively be any suitable type of filter (e.g., infinite impulse response (IIR) filters, fourier-transform based fillers).

The blocker filter 140 output sample rate is preferably matched to the output sample rate of the blocker filter present in the RF transmitter (where a blocker filter is standard). If the input sample rate of the blocker filter is not equal to the desired RF transmitter blocker filter sample rate, the blocker filter 140 may perform sample rate conversion in a substantially similar manner to the upsampler 112 and/or the downsampler 114.

The filter inverter 145 preferably functions to remove or reduce the effects of the blocker filter 140. The filter inverter 145 is preferably used to remove or reduce the effects of the blocker filter 140 on a residue signal sampled by the transform adaptor 130 (wherein the residue signal refers to the digital transmit signal after combination with the self-interference cancellation signal). The filter inverter 145 thus enables the transform adaptor 130 to perform optimization based upon the amount of self-interference that would remain without the contribution of the blocker filter (i.e., providing better data to tune upon). Use of the filter inverter 145 may result in substantially faster convergence of transform configuration parameters.

In a variation of a preferred embodiment, the filter inverter 145 may additionally or alternatively function to remove or reduce the effects of filters or components (other than the blocker filter) on the residue signal sampled by the transform adaptor 130. In some instances, it may be desirable to remove or reduce effects induced by the receiver of the communications system (or any other elements or components present in the signal path between the multi-rate adaptive filter 120 and the transform adaptor 130). As a specific example, when the digital self-interference cancellation signal is injected into the RF receive signal (as shown in FIGS. 4C and 4D), the filter inverter 145 may function to remove or reduce the effects of RF receiver components (e.g., distortions resulting from amplification and/or analog-to-digital conversion).

The gain/phase compensator 150 functions to modify the gain and phase of either the digital receive signal or the digital self-interference cancellation signal such that the two signals are aligned in gain and phase. The gain/phase compensator 150 thus enables the system 100 to compensate for gain and/or phase error induced by the receive chain (or other sources).

Gain/phase correction values are preferably set by the transform adaptor 130, but may additionally or alternatively be set in any manner.

In a variation of a preferred embodiment, the system 100 includes a gain/phase compensator 150 intended to correct for transmitter gain/phase error, as shown in FIG. 8.

2. Method for Multi-Rate Digital Self-Interference Cancellation

As shown in FIG. 9, a method 200 for multi-rate digital self-interference cancellation includes receiving a digital transmit signal S210, generating a set of digital transmit signal components S220, transforming the set of digital transmit signal components into a self-interference cancellation signal S230, and combining the self-interference cancellation signal with a digital receive signal S240. The method 200 may additionally include dynamically adapting the transform configuration S250 and/or performing gain/phase correction S260.

Analogously to the system 100, the method 200 functions to reduce self-interference in full-duplex wireless communications systems by canceling components of self-interference present in digital signals resulting from RF transmissions. The method 200 reduces digital self-interference in full-duplex wireless communications systems by sampling a digital transmit signal (Step S210). The received digital transmit signal is processed into a set of signal components (Step S220) after which point the signal components may be transformed into a digital self-interference signal according to a transform configuration (Step S230). The self-interference signals are then combined with a digital receive signal of the full-duplex wireless communication system (Step S240) in order to reduce self-interference signals present in the signal received by the wireless communication system. The method 200 may also include adapting the transform configuration dynamically (Step S250) in order to increase the effectiveness of self-interference reduction due to self-interference transformation and/or performing gain/phase correction to align gain and phase of the receive signal and the digital self-interference cancellation signal (Step S260).

The method 200 is preferably implemented by the system 100, but may additionally or alternatively be implemented by any suitable system for multi-rate digital self-interference cancellation used with full-duplex wireless communications systems. Additionally or alternatively, the method 200 may be implemented using active sensing systems (e.g., RADAR), wired communications systems, wireless communications systems, and/or any other suitable system, including communications systems where transmit and receive bands are close in frequency, but not overlapping.

Step S210 includes receiving a digital transmit signal. Step S210 functions to provide a digital signal intended for transmission by a full-duplex wireless communications system so that the signal may be used to remove self-interference at the full-duplex wireless communications system receiver. Digital transmit signals received in S210 preferably include digital signals originating from an electronic device, destined for an RF transmitter of a full-duplex radio (or other full-duplex wireless communications system). Digital transmit signals received in S210 may additionally or alternatively include digital transmit signals converted from analog transmit signals (e.g., the RF transmission signal of the RF transmitter of a full-duplex radio) or from any other suitable source. Digital transmit signals received in S210 are preferably encoded for conversion to an analog signal by an RF transmitter, (e.g., encoded via PSK, QAM, OFDM, etc.) but may additionally or alternatively be encoded in any suitable way.

Step S220 includes generating a set of signal components. Step S220 functions to generate a set of signal components from the digital transmit signal such that the signal components may be used (in Step S230) to generate a digital self-interference cancellation signal.

Step S220 preferably includes generating a set of signal components according to a transform configuration. Step S220 functions to transform digital transmit signals into digital transmit signal components; that is, signal components that may be weighted and combined to represent a hypothesized contribution of non-linear self-interference to a received digital signal. Non-linear self-interference contributions may result from a variety of sources, including components in both RF receivers and RF transmitters of full-duplex radios (e.g., mixers, power amplifiers, ADCs, DACs, etc.). Further, non-linear self-interference contributions may vary randomly, or with environmental or input conditions (e.g. transmission power, ambient temperature, etc.).

In one embodiment of the invention, Step S220 includes transforming a digital transmit signal into a set of signal components through use of a process substantially similar to the one described in the system 100 description (and as shown in FIG. 5 and FIG. 6). In this embodiment, Step S220 may include generating signal components according to transform paths, where each transform path corresponds to a component of a self-interference model. Step S220 preferably includes generating signal components for each transform path in parallel simultaneously, but may additionally or alternatively generate them serially and/or transform them at separate times. While S220 preferably includes transforming identical digital transmit signals for each transform path, the digital transmit signals may additionally or alternatively be processed in any suitable way (for instance, S220 may include splitting the digital transmit signal into components and passing separate components to each transform path).

Step S230 functions to transform the set of signal components into a self-interference cancellation signal according to a transform configuration. Step S230 preferably includes creating a self-interference cancellation signal by combining a weighted sum of signal components according to mathematical models adapted to model self-interference contributions of the RF transmitter, RF receiver, and/or other sources. Examples of mathematical models that may be used include generalized memory polynomial (GMP) models, Volterra models, and Wiener-Hammerstein models; Step S230 may additionally or alternatively use any combination or set of models.

Step S230 preferably performs self-interference cancellation signal generation according to a transform configuration set dynamically in Step S240. Additionally or alternatively, Step S230 may perform self-interference cancellation signal generation in any manner.

Step S240 includes combining the non-linear self-interference signal with a digital receive signal. Step S240 functions to combine self interference cancellation signals with digital signals received by the RF receiver. Step S240 preferably includes combining self-interference cancellation signals with digital receive signals from an RF receiver of a full-duplex wireless communications system. Step S240 may additionally or alternatively include combining self-interference cancellation signals with any suitable receive signal.

Step S240 may include performing post-processing to prepare self-interference cancellation signals for combination with digital receive signals; this may include scaling, shifting, filtering, and/or otherwise modifying the self-interference signals. For example, S240 may include processing self-interference cancellation signals with a blocker filter designed to filter out high-frequency components (e.g., to match a corresponding bandwidth of the RF transmitter). Step S240 may include matching the sampling rate of self-interference cancellation signals with the sampling rate of the output of the RF receiver through upsampling and/or downsampling as previously described, but may additionally or alternatively not alter the sampling rate of self-interference cancellation signals or set the sampling rate of self-interference cancellation signals to a sampling rate other than that of RF receiver output.

Step S240 may include combining linear and non-linear self-interference signals in any suitable way (e.g., if multiple multi-rate filters are used), including combining non-linear or linear self-interference cancellation signal components. For example, S240 may include combining linear and non-linear self-interference signals as a weighted sum.

Step S250 includes dynamically adapting the transform configuration. Step S250 functions to update and/or change the transform configuration used in creating a self-interference cancellation signal based on changes in signal or environmental conditions. The transform configuration is preferably as described in the system 100 description, but may additionally or alternatively comprise any parameter or set of parameters corresponding to Step S220 and/or Step S230.

Dynamically adapting the transform configuration S250 may include setting an updated transform configuration by selecting from stored static configurations, from generating a new transform configuration, or by any other suitable manner or combination of manners. For example, S250 may include choosing from three static transform configurations based on their applicability to particular signal and/or environmental conditions (the first is appropriate for low transmitter power, the second for medium transmitter power, and the third for high transmitter power). As another example, S250 may include generating an updated configuration based on signal and/or environmental conditions; if a GMP model is used in non-linear transformation, the coefficients of a GMP model may be computed by a formula that takes transmitter power, temperature, and receiver power as input.

Step S250 may include setting transform configurations based on a variety of input data (whether transform configurations are selected from a set of static configurations or generated according to a formula or model). Input data may include static environmental and system data (e.g. receiver operating characteristics, transmitter operating characteristics, receiver elevation above sea-level), dynamic environmental and system data (e.g. current ambient temperature, current receiver temperature, average transmitter power, ambient humidity), and/or system configuration data (e.g. receiver/transmitter settings), signal data (e.g., digital transmit signal, RF transmit signal, RF receive signal, digital receive signal).

Step S250 may be performed at any time, but is preferably performed in response to either a time threshold or other input data threshold being crossed. For example, S250 may adapt transform configurations every ten seconds according to changed input data values. As another example, transform configurations may be re-set whenever transmitter power thresholds are crossed (e.g. whenever transmitter power increases by ten percent since the last transform configuration setting, or whenever transmitter power increases over some static value).

Step S250 may additionally or alternatively include cooperating with analog cancellation methods of a full-duplex radio if present; for instance, adapting transform configurations based on analog cancellation data, or coordinating transform configuration setting times based on analog cancellation configurations to reduce overall self-interference (or for any other suitable reason).

Step S250 preferably adapts transform configurations to reduce self-interference for a given transmit signal and set of system/environmental conditions. Step S250 may adapt transform configurations and/or transform-configuration-generating algorithms using analytical methods, online gradient-descent methods, least-mean-squares (LMS) methods, recursive-least-squares (RLS) methods, regularized and constrained solver methods (e.g. LASSO), and/or any other suitable methods. LMS methods may include regularization, one example LMS method includes leaky LMS; RLS methods may also include regularization. Adapting transform configurations preferably includes changing transform configurations based on learning. In the case of a neural-network model, this might include altering the structure and/or weights of a neural network based on test inputs. In the case of a GMP polynomial model, this might include optimizing GMP polynomial coefficients according to a gradient-descent method.

In one implementation of a preferred embodiment, Step S250 includes adapting transform configurations based on a ratio of the receive and transmit channels $$\frac{Rx}{Tx} = H - \hat{H}$$

by performing iterative measurements to determine the RX/TX ratio.

The magnitude and phase of the RX/TX ratio are preferably determined by measuring the magnitude of the Rx signal (i.e., the residual component of self-interference present in the receive signal after self-interference cancellation) at multiple transform configurations (represented by PI), where each cancellation circuit setting corresponds to a different phase response.

To measure the Rx signal, the composite receive signal (i.e., the receive signal after self-interference cancellation) is preferably measured during a period where transmit signal noise dominates the composite receive signal (i.e., transmit signal noise is substantially greater in magnitude than any other signal component of the composite receive signal). Correspondingly, Step S250 may include detecting that transmit signal noise is the dominant component of the composite receive signal.

The Tx signal is preferably assumed to be constant (for a given transmit power). Since the self-interference cancellation channel is known for each transform configuration the change in magnitude of the Rx signal (and thus Rx/Tx, for constant Tx) can be correlated to the change in response of the self-interference cancellation channel; from this correlation, Rx/Tx and the self-interference channel H can be determined, and the self-interference cancellation channel can be optimized to reduce self-interference. For example, the receive signal may be measured at two times (during a period where transmit signal noise is dominant).

Receive signal 1≈$Rx_1$, Receive signal 2≈$Rx_2$ $Rx_1 = Tx(H - \hat{H}_1)$ $Rx_2 = Tx(H - \hat{H}_2)$ from these equations, H can be determined, and $\hat{H}$ can be tuned to reduce self-interference.

In some implementations, the Rx/Tx ratio may be measured as follows:

$$\frac{Tx^* \times Rx}{Tx^* \times Tx}$$

Additionally or alternatively, Step S250 may include measuring the Rx/Tx ratio in any other manner.

Step S250 may further include adapting transform configurations based on an average of Rx/Tx ratios—averaging representing a tradeoff between speed and accuracy. In general, more samples in an average increases the signal to noise ratio (SNR) of the measured signal, but results in slower adaptation. In one variation of a preferred embodiment, Step S250 includes increasing averaging sample amount as the Rx/Tx ratio decreases (e.g., below certain threshold values).

In a variation of a preferred embodiment, Step S250 includes transforming receive signal samples and transmit signal samples (Rx and Tx) from the time domain to the frequency domain using a Fast Fourier Transform (FFT), computing a solution for transform configuration settings in the frequency domain, and then converting the solution to a time-domain solution using an inverse Fast Fourier Transform.

Step S250 may additionally or alternatively include adapting transform configurations based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, transform configurations may be adapted based on historical received data (e.g. what the signal looked like ten seconds ago) or any other suitable information. Transform configurations may additionally or alternatively be updated based on the content of the transmitted signal.

Step S260 includes performing gain/phase correction. Step S260 functions to modify the gain and phase of either (or both of) the digital receive signal or the digital self-interference cancellation signal such that the two signals are aligned in gain and phase. Step S260 thus enables the method 200 to compensate for gain and/or phase error induced by the receive chain (or other sources).

The methods of the preferred embodiment and variations thereof can be embodied and/or implemented at least in part as a machine configured to receive a computer-readable medium storing computer-readable instructions. The instructions are preferably executed by computer-executable components preferably integrated with a system for digital self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for multi-rate digital self-interference cancellation comprising:
   a signal component generation system coupled to a digital transmit signal of a communication system that generates a set of signal components from the digital transmit signal; wherein the signal component generation system comprises a set of transform paths; wherein each transform path comprises a component generator and an anti-aliasing filter; wherein a majority of the set of transform paths further comprise an upsampler, a downsampler, and a signal multiplier; wherein signal multipliers couple transform paths to at least one other transform path;
   a multi-rate adaptive filter that transforms the set of signal components into a digital self-interference cancellation signal according to a transform configuration, wherein the digital self-interference cancellation signal is combined with a receive signal of the communication system to form an interference-reduced receive signal; and
   a transform adaptor that dynamically sets the transform configuration in response to changes in the interference-reduced receive signal.

2. The system of claim 1, wherein each transform path further comprises a frequency shifter.

3. The system of claim 1, wherein the set of transform paths comprises a first transform path and a second transform path; the first transform path having a component generator of order one, and the second transform path having a component generator of order three.

4. The system of claim 3, wherein the first transform path comprises a downsampler that downsamples by a first factor; wherein the second transform path comprises a downsampler that downsamples by a second factor.

5. The system of claim 4, wherein the first factor and the second factor are equal.

6. The system of claim 4, wherein the second transform path further comprises an upsampler that upsamples by a third factor.

7. The system of claim 3, wherein the multi-rate adaptive filter comprises a first filter and a second filter; wherein the self-interference cancellation signal is generated from a combination of outputs of the first filter and the second filter; wherein the first filter transforms only first order signal components; wherein the second filter transforms only non-first order signal components.

8. The system of claim 1, further comprising a blocker filter that removes undesired components of the self-interference cancellation signal.

9. The system of claim 8, further comprising a filter inverter coupled to the transform adaptor that reduces the effect of the blocker filter on the interference-reduced receive signal as sampled by the transform adaptor.

10. The system of claim 8, further comprising a filter inverter coupled to the transform adaptor that reduces the effect of receiver components on the interference-reduced receive signal as sampled by the transform adaptor.

11. The system of claim 1, further comprising a gain/phase compensator that modifies gain and phase of the digital self-interference cancellation signal to reduce gain/phase error relative to the receive signal.

12. The system of claim 1, further comprising a gain/phase compensator that modifies gain and phase of the receive signal to reduce gain/phase error relative to the digital self-interference cancellation signal.

13. The system of claim 1, wherein size of the set of signal components is determined by the transform configuration.

14. The system of claim 1, wherein the transform adaptor dynamically sets the transform configuration in response to changes in a ratio of a frequency-domain-transformed interference-reduced receive signal to a frequency-domain-transformed digital transmit signal.

15. A method for multi-rate digital self-interference cancellation comprising:
- receiving a digital transmit signal of a communication system;
- generating a set of signal components from the digital transmit signal;
- wherein generating the set of signal components comprises:
  - generating a first signal component by upsampling the digital transmit signal;
  - performing signal component generation, according to a self-interference model, on the upsampled digital transmit signal;
  - downsampling the generated signal component; and
  - performing anti-aliasing filtering on the downsampled signal component;
- transforming the set of signal components into a digital self-interference cancellation signal according to a transform configuration;
- combining the digital self-interference cancellation signal with a receive signal of the communication system to form an interference-reduced receive signal; and
- dynamically adapting the transform configuration in response to changes in the interference-reduced receive signal.

16. The method of claim 15, wherein generating the set of signal components comprises generating a second signal component by downsampling the digital transmit signal; and performing anti-aliasing filtering on the downsampled signal.

17. The method of claim 16, wherein dynamically adapting the transform configuration comprises dynamically adapting the transform configuration in response to changes in a ratio of receive and transmit signals.

18. The method of claim 16, wherein dynamically adapting the transform configuration comprises dynamically adapting the transform configuration in response to changes in a frequency-domain-converted ratio of receive and transmit signals.

19. The method of claim 16, wherein dynamically adapting the transform configuration comprises dynamically adapting the transform configuration in response to changes in a time-averaged ratio of receive and transmit signals; wherein the time-averaged ratio is averaged over a first number of samples.

20. The method of claim 19, wherein dynamically adapting the transform configuration further comprises dynamically changing the first number of samples.

21. The method of claim 20, wherein dynamically changing the first number of samples comprises increasing the first number of samples in response to a decrease in the time-averaged ratio of receive and transmit signals.

22. The method of claim 16, wherein dynamically adapting the transform configuration comprises dynamically adapting the transform configuration in response to changes in a ratio of a first product and a second product; wherein the first product is a product of a receive signal and a conjugate of a transmit signal; wherein the second product is a product of the transmit signal and the conjugate of the transmit signal.

* * * * *